United States Patent [19]
Smith

[11] 3,731,112
[45] May 1, 1973

[54] REGULATED POWER SUPPLY WITH DIODE CAPACITOR MATRIX

[76] Inventor: Aubrey H. Smith, 6619 Pershing Boulevard, Kenosha, Wis. 53140

[22] Filed: Dec. 15, 1971

[21] Appl. No.: 208,488

Related U.S. Application Data

[62] Division of Ser. No. 131,624, April 6, 1971.

[52] U.S. Cl......................307/109, 323/1, 323/22 T, 323/22 Z
[51] Int. Cl...............................................H02m 3/06
[58] Field of Search......................307/109, 110, 127, 307/236, 262; 320/1; 323/1, 16, 19, 22 Z; 328/140

[56] References Cited
UNITED STATES PATENTS

| | | | |
|---|---|---|---|
| 3,240,958 | 3/1966 | Kerios et al. | 307/110 |
| 3,553,480 | 1/1971 | Lehmann et al. | 307/110 |
| 3,375,378 | 3/1968 | Vandemore et al. | 320/1 X |
| 3,500,342 | 3/1970 | Bissett et al. | 230/1 X |
| 3,631,259 | 12/1971 | Kiyota | 320/1 X |

Primary Examiner—A. D. Pellinen
Attorney—R. J. McCloskey

[57] ABSTRACT

A regulated power supply is provided capable of energizing various components of a control system. The regulated power supply includes a negative power supply which comprises an astable multivibrator and a diode-capacitor matrix for directly converting a positive voltage to a regulated negative voltage.

6 Claims, 2 Drawing Figures

NEGATIVE POWER SUPPLY

REGULATED POWER SUPPLY WITH DIODE CAPACITOR MATRIX

This is a divisional of application Ser. No. 131,624 filed Apr. 6, 1971.

An object of the present invention is to provide a new and improved control system for controlling the energy directed from a power source to a load including a regulated negative power supply comprising an astable multivibrator and a diode-capacitor matrix connected to the astable multivibrator for inverting the positive voltage supplied to the astable multivibrator directly to a regulated negative voltage.

A further object of the present invention is to provide a power supply for producing a regulated voltage including a power source, an astable multivibrator having a first gate and a second gate, each of the gates being connectable to the power source and having first and second output conditions, the first gate having the first output condition when the second gate has the second output condition and the first gate having the second output condition when the second gate has the first output condition, first energy storage means connected to the output of the first gate, second energy storage means connected to the output of the second gate, third energy storage means connected to the first and second energy storage means and operable to apply a predetermined voltage, the first energy storage means charging when the first gate is in the first condition and discharging when the first gate is in the second condition, the second energy storage means charging when the second gate is in the first condition and discharging when the second gate is in the second condition, the third energy storage means being charged by the first energy storage means when the first gate is in the second condition and being charged by the second energy storage means when the second gate is in the second condition, the third energy storage means being charged by the first and second energy storage means to the predetermined voltage and regulating means connected across the third energy storage means for regulating the voltage applied by the third energy storage means.

Further objects and advantages of the present invention will become apparent from the following detailed description of the present invention taken in conjunction with the following drawings wherein.

Figure 1:
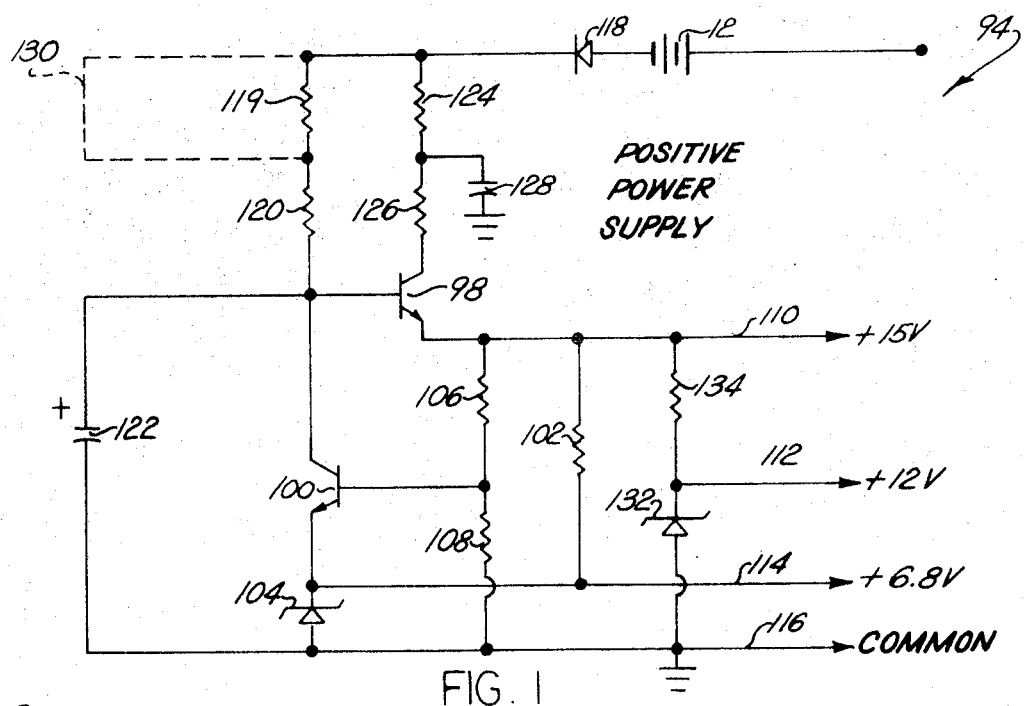
FIG. 1 is a schematic illustration of the positive power supply.

A regulated power supply is provided to energize the various components of a control system. The power supply includes a positive power supply 94 and a negative power supply 96. The positive power supply 94 has three outputs therefrom having potentials of plus 12 volts, plus 6.8 volts and 15 volts. The negative power supply has a single output of a minus 6.8 volts.

The positive power supply 94 which is more fully illustrated in FIG. 1, includes transistors 98 and 100. Transistor 98 is a series-regulating variable-impedance transistor whose conductivity is controlled by the collector current of transistor 100. A resistor 102 is connected between the emitter of transistor 98 and the emitter of transistor 100. The resistor 102 limits the amount of current flowing through Zener diode 104 which is connected to the emitter of transistor 100. The current flow through resistor 102 plus the emitter current of transistor 100 establishes the reference voltage for the Zener diode 104 which in this case is plus 6.8 volts. The base of transistor 100 provides a feedback network for the power supply and is connected to a pair of resistors 106 and 108 which form a voltage divider network have values such that line 110 will always be a plus 15 volts and the base of transistor 100 will be at 6.8 volts plus the base emitter voltage drop of transistor 100. An increase in the potential at the base of transistor 100 will tend to decrease the potential at the emitter of transistor 98 and a decrease in potential at the base of transistor 100 will tend to increase the potential at the emitter of transistor 98 to thereby hold line 110 at plus 15 volts. Thus, the transistors 98 and 100 cooperate to form a negative feedback amplifier utilizing zener diode 104 as a reference.

A battery 12 is connected to the positive power supply 94 through a diode 118 which acts as an isolation diode to prevent negative voltage pulses from occurring in the power supply. When positive pulses occur, resistors 119 and 120 cooperate with the capacitor 122 to form a noise attenuation circuit for the base of transistor 98 and resistors 124 and 126 and capacitor 128 form a noise attenuation circuit for the collector of transistor 98. Since it is desired to utilize the regulated power supply with batteries having different potentials which may range approximately from 18 to 80 volts a jumper 130 is provided to bypass resistor 119. Generally, when the power supply 94 is used with a battery 12 having a potential above 36 volts the jumper 130 will not be utilized, but if a battery potential below 36 volts is utilized the jumper 130 will be connected across resistor 119 to isolate the resistor from the circuit.

The available outputs of the positive power supply 94 are plus 15 volts along line 110, plus 12 volts along line 112, plus 6.8 volts along line 114 and ground potential along line 116. The 12 volt output along line 112 is obtained by applying the 15 volt supply across the Zener diode 132. A resistor 134 is series connected with the Zener diode 132 to limit the current flow to the Zener diode 132.

Figure 2:
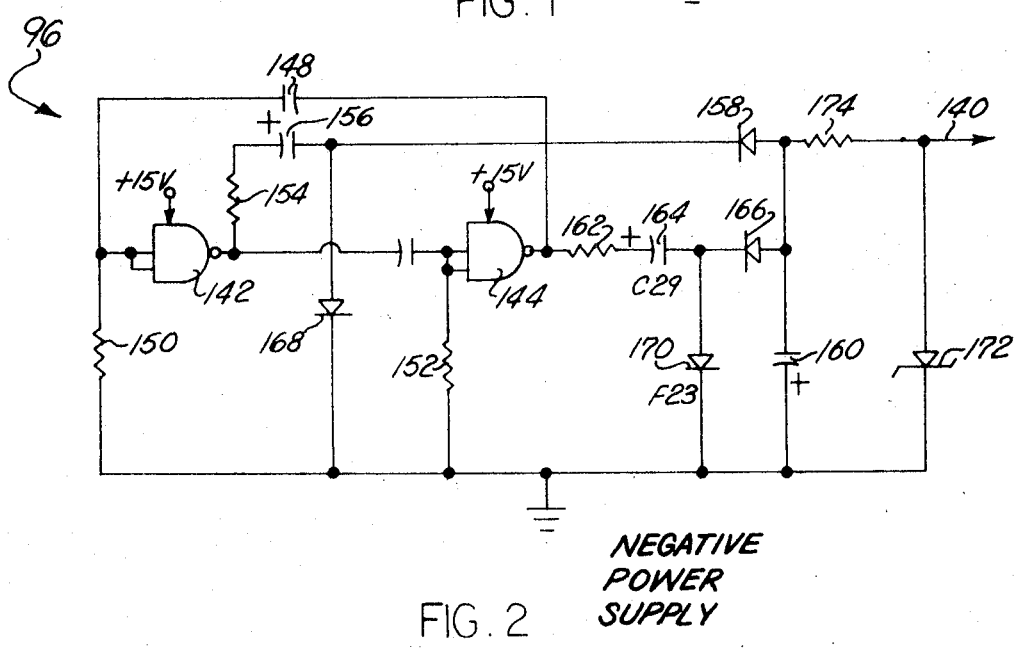
FIG. 2 is a schematic illustration of the negative power supply.

Since many control system utilize operational amplifiers in stable high gain circuits, the provision of a negative power supply to operate the amplifiers is critical. The common way of producing a negative power supply is to utilize an inverter to drive a small transformer. However, the utilization of a transformer yields a bulky and costly configuration. The present control system utilizes an astable multivibrator for driving a diode-capacitor matrix illustrated in FIG. 2, which inverts the positive power supplied to the multivibrator directly to a negative voltage. This method is not only economical but also requires very little space.

The astable multivibrator includes a pair of NAND gates 142 and 144 each having a plus 15 volt input from the positive power supply 94. A pair of capacitors 156 and 148 introduce feedback to the astable multivibrator. Resistors 150 and 152 are respectively connected to the input of the NAND gate 142 and the NAND gate 144. The resistors 150 and 152 are unequal to assure starting of the multivibrator formed by the NAND gates 142 and 144 upon the application of a potential thereto. When the output of the NAND gate 142 is high, the output of NAND gate 144 will be low and conversely when the output of NAND gate 144 is high the output of NAND gate 142 will be low.

Connected to the output of gate 142 is a resistor 154 and a capacitor 156. Capacitor 156 is connected through diode 158 to a capacitor 160. Connected to the output of gate 144 is a resistor 162 and a capacitor 164. The capacitor 164 is connected to the capacitor 160 through a diode 166. When the output of gate 142 is high, the capacitor 156 will charge, to approximately 15 volts with a polarity indicated by the plus sign in FIG. 2, through resistor 154 and through a diode 168 which is connected to the ground. When the output of gate 142 goes to low or ground, the capacitor 156 will attempt to discharge through the path including the output of gate 142, resistor 154, diode 158 and capacitor 160. The result of discharging of capacitor 156 through capacitor 160 is that the charge on capacitor 156 will be distributed between capacitors 160 and 156 according to the law of division of charge for capacitors. The polarity of the charge applied to capacitor 160 by capacitor 156 will be that shown by the plus sign in FIG. 2 associated with capacitor 160.

While capacitor 156 is charging capacitor 160, the NAND gate 144 will be in its high state charging capacitor 164 through the path including resistor 162 and a diode 170 which is connected to ground. The capacitor 164 will be charged to approximately 15 volts with the polarity indicated by the plus sign in FIG. 2 associated with capacitor 164. When the astable multivibrator changes state again and the output of gate 144 goes to ground, the capacitor 164 will discharge through the path consisting of the output of gate 144, resistor 162, diode 166 and capacitor 160. The discharging of capacitor 164 will again charge the capacitor 160 to a polarity indicated by the plus sign in FIG. 2. Thus, it should be apparent that the capacitor 156 will charge capacitor 160 during half of the period of oscillation of the astable multivibrator and capacitor 164 will charge capacitor 160 during the other half of the period. The result is a full wave output applied to capacitor 160. Connected across capacitor 160 is a Zener diode 172 having its cathode connected to the ground line. The Zener diode regulates the output from capacitor 160 to line 140, the output line of the negative power supply 96. A resistor 174 is connected to the anode of the Zener diode 172 to limit the current through the diode. Accordingly, the line 140 maintains a minus 6.8 volt potential thereon from capacitor 160.

This power supply includes a positive power supply and a negative power supply for energizing various system components. The negative power supply includes an astable multivibrator and a diode-capacitor matrix which operates to directly invert a positive voltage to thereby provide a negative voltage at the output terminal thereof.

I now claim:

1. A power supply for producing a regulated voltage comprising, a power source, an astable multivibrator having a first gate and a second gate, each of said gates being connectable to the power source and having first and second output conditions, said first gate having said first output condition when said second gate has said second output condition and said first gate having said second output condition when said second gate has said first output condition, first energy storage means connected to the output of said first gate, second energy storage means connected to the output of said second gate, third energy storage means connected to said first and second energy storage means and operable to apply a predetermined voltage, said first energy storage means charging when said first gate is in said first condition and discharging when said first gate is in said second condition, said second energy storage means charging when said second gate is in said first condition and discharging when said second gate is in said second condition, said third energy storage means being charged by said first energy storage means when said first gate is in said second condition and being charged by said second energy storage means when said second gate is in said second condition, said third energy storage means being charged by said first and second energy storage means to said predetermined voltage, and voltage regulating means connected across said third energy storage means for regulating the voltage applied by said third energy storage means.

2. A power supply for producing a regulated voltage as defined in claim 1 wherein said first energy storage means includes a first capacitor, said second energy storage means includes a second capacitor, and said third energy storage means includes a third capacitor, said third capacitor being charged to a predetermined negative voltage with respect to the power source.

3. A power supply for producing a regulated voltage as defined in claim 2 further including a first diode having its cathode connected to said first capacitor and its anode connected to said third capacitor, and a second diode having its cathode connected to said second capacitor and its anode connected to said third capacitor, said first and second diodes controlling the flow of current to said third capacitor to enable said third capacitor to be charged to the negative voltage with respect to the power source.

4. A power supply for producing a regulated voltage as defined in claim 3 further including a third diode having its anode connected to said first capacitor and its cathode connected to ground, a fourth diode having its anode connected to said second capacitor and its cathode connected to a ground and wherein said voltage regulating means includes a Zener diode connected across said third capacitor for regulating the voltage output therefrom.

5. A regulated power supply for producing a regulated voltage comprising, a positive power source for establishing a positive potential, an astable multivibrator connected to the positive power source, a diode-capacitor matrix connected to the output of said astable multivibrator for inverting the positive potential supplied to said astable multivibrator directly to a negative voltage and voltage regulating means connected to said diode capacitor matrix for regulating said negative voltage established by said diode capacitor matrix, wherein said astable multivibrator includes a first gate and a second gate, said diode-capacitor matrix including a first capacitor connected to the output of said first gate, a first diode having its cathode connected to said first capacitor, a third capacitor connected to the anode of said first diode, a second capacitor connected to the output of said second gate, and a second diode having its cathode connected to said second capacitor, said third capacitor being connected to the anode of said second diode and applying a negative voltage.

6. A regulated negative power supply for use with a power source as defined in claim 5 wherein said voltage regulating means includes a Zener diode connected across said third capacitor for regulating the negative voltage applied by said third capacitor.

* * * * *